(12) United States Patent
B'Far et al.

(10) Patent No.: US 8,312,171 B2
(45) Date of Patent: Nov. 13, 2012

(54) GENERIC PREVENTATIVE USER INTERFACE CONTROLS

(75) Inventors: Reza B'Far, Huntington Beach, CA (US); Lloyd Boucher, Santa Ana, CA (US); Mike Adourian, Irvine, CA (US); Fei Wihardjo, Austin, TX (US); Sreedhar Chitullapally, Irvine, CA (US); Logan Goh, Irvine, CA (US); Malini Chakrabarti, Cliffside Park, NJ (US)

(73) Assignee: Oracle International Corp., Redwood Shores, CA (US)

(*) Notice: Subject to any disclaimer, the term of this patent is extended or adjusted under 35 U.S.C. 154(b) by 137 days.

(21) Appl. No.: 12/749,224

(22) Filed: Mar. 29, 2010

(65) Prior Publication Data

US 2010/0250779 A1    Sep. 30, 2010

Related U.S. Application Data

(60) Provisional application No. 61/164,363, filed on Mar. 27, 2009.

(51) Int. Cl.
*G06F 15/16* (2006.01)
(52) U.S. Cl. ............................... 709/246; 707/999.102
(58) Field of Classification Search .................. 709/246; 707/999.102
See application file for complete search history.

(56) References Cited

U.S. PATENT DOCUMENTS

| | | | |
|---|---|---|---|
| 6,076,083 A | 6/2000 | Baker | |
| 7,266,847 B2 * | 9/2007 | Pauker et al. | 726/27 |
| 7,340,469 B1 | 3/2008 | Alghathbar et al. | |
| 7,539,676 B2 * | 5/2009 | Aravamudan et al. | 1/1 |
| 7,657,935 B2 | 2/2010 | Stolfo et al. | |
| 8,131,677 B2 | 3/2012 | Hsu | |
| 2003/0088449 A1 | 5/2003 | Menninger | |
| 2004/0093344 A1 | 5/2004 | Berger et al. | |
| 2005/0097449 A1 * | 5/2005 | Lumera et al. | 715/511 |
| 2006/0262740 A1 * | 11/2006 | Schirmer et al. | 370/315 |
| 2007/0143338 A1 | 6/2007 | Wang et al. | |
| 2008/0010609 A1 * | 1/2008 | Curtis et al. | 715/810 |
| 2008/0256121 A1 | 10/2008 | Liu et al. | |
| 2009/0183227 A1 * | 7/2009 | Isaacs et al. | 726/1 |
| 2009/0300002 A1 | 12/2009 | Thomas et al. | |
| 2009/0328222 A1 | 12/2009 | Helman et al. | |

OTHER PUBLICATIONS

Bishop, Christopher M., *Pattern Recognition and Machine Learning*, Springer, New York, NY (2006).
Bruns, et al., "A Simple and Expressive Semantic Framework for Policy Composition in Access Control," *ACM SIG on Security, Audit and Control*, 10pp (2007).
Codd, E. F., "A Relational Model of Data for Large Shared Data Banks," *Communications of the ACM*, vol. 13, No. 6, pp. 377-387 (Jun. 1970).

(Continued)

*Primary Examiner* — David Lazaro
*Assistant Examiner* — Marie Georges Henry
(74) *Attorney, Agent, or Firm* — Kilpatrick Townsend & Stockton LLP

(57) ABSTRACT

Techniques for enforcing policies. A user requests content from an application and content is retrieved from the application. A determination is made whether any policies apply to the content. A script adapted to modify processing of the content according to any applicable policies is injected into a response to the user. The script may be dynamically generated, pulled from a cache or other data store, or a combination thereof.

20 Claims, 6 Drawing Sheets

OTHER PUBLICATIONS

De Luca, Ernesto William and Andreas Nurnberger, "Ontology-Based Semantic Online Classification of Documents: Supporting Users in Searching the Web," *Proc. of the European Symposium on Intelligent Technologies (Eunite )*, 9pp., (2004).

Fukunaga, Keinosuke, *Statistical Pattern Recognition*, Morgan Kaufmann, San Francisco, CA (1990).

Gray, Jim, "The Transaction Concept: Virtues and Limitations," *Proceedings of the 7th International Conference on Very Large Data Bases*, pp. 144-154, Tandem Computers: Cupertino, CA (Sep. 1983).

Huynh, et al., "The Semantic User Interface Paradigm for Presenting Semi-structured Information," 2pp, MIT Artificial Intelligence Laboratory, Cambridge, MA (2002).

Russell, et al., "NITELIGHT: A Graphical Tool for Sematic Query Construction," in *Semantic Web User Interaction Workshop (SWUI )*, 10pp., Florence, Italy (Apr. 2008).

Stanford Center for Biomedical Informatics Research, "The Protégé Ontology Editor and Knowledge Acquisition System," 1 pg. http://protege.stanford.edu/ (accessed Jun. 2010).

Taylor, James with Neil Raden, *Smart (Enough) Systems*, Prentice Hall, Boston, MA (2007).

Weiss, Sholom and Casimir Kulikowski, *Computer Systems That Learn*, Morgan Kaufmann, San Mateo, CA (1991).

Yahoo! Inc., "Pipes: Rewire the Web," 1 pg. http://pipes.yahoo.com/pipes/ (accessed Jun. 2010).

Dean, Jeffrey and Sanjay Ghemawat, "MapReduce: Simplified Data Processing on Large Clusters," *Proceedings of the 6th Symposium on Operating Systems Design and Implementation (OSDI '04)*, 2004, pp. 137-149.

\* cited by examiner

Employee Salaries: 402 404

| Anderson, Abe | $123,456 | Change |
| Browser, Barbara | $789,101 | Change |
| Charles, Charlie | $ 31,415 | Change | 404
| Davis, David | $ 55,000 | Change |
| Engle, Emma | $ 81,395 | Change | 404

(Before)

Employee Salaries: 402

| XXXXXXX | $789,101 |
| XXXXXXX | $ 35,415 |
| XXXXXXX | $ 81,345 |
| XXXXXXX | $123,456 |
| XXXXXXX | $ 55,006 |

(After)

GENERIC PREVENTATIVE USER INTERFACE CONTROLS

CROSS-REFERENCES TO RELATED APPLICATIONS

The present application claims the benefit of priority under 35 U.S.C. §119(e) of U.S. Provisional Application No. 61/164,363, filed on Mar. 27, 2009, the full disclosure of which is incorporated herein by reference. The present application also incorporates by reference the full disclosure of U.S. application Ser. No. 12/714,206, with the title of "Techniques for Semantic Business Policy Composition."

BACKGROUND OF THE INVENTION

Businesses often have internal business policies intended to address a wide range of issues such as security, privacy, trade secrets, criminal activity of employees or others with access to the business, and many others. These business policies address various aspects of a business, such as purchasing, selling, marketing, and internal administration. Because of the large number of activities occurring during the course of running a business, which may have various entities located in a variety of geographical locations, it is often impractical to manually monitor all activities in which improper behavior or mistakes may occur.

One approach to implementing business policies has been to monitor and control computer systems used to facilitate a business' activities. For example, information regarding various activities, such as sales and payroll, are often stored in one or more data stores. This information may be analyzed to find activity that might be in violation of a business policy, such as an item on an invoice or paycheck to an employee being outside of a specified range, or a particular employee attempting to access information to which he or she is not entitled access.

Various information stored in a business' computing systems may be accessed through various applications, which may be specific to certain departments, such as accounting, human resources, or other departments relevant to a business' operations. Because information is typically needed by many people who may be located in diverse geographic locations, applications are often hosted on a server and accessed over a communications network by various users using client devices, such as a desktop or notebook computer. The client devices may communicate with the server using various protocols, such as HTTP, using a browser or other software. Users accessing the applications often have varied roles and responsibilities in an organization and, as a result, may have varied access to information and control over computing systems. For example, for privacy reasons, salaries, personal data, and other information may be accessible only to certain employees. Similarly, in order to maintain data integrity and otherwise ensure efficient operation of a business, the ability to change or delete certain electronically stored files may be limited to a certain class of employee.

Accordingly, one way of enforcing policies is to control the behavior of applications to operate in accordance with a business' policies, such as in ways described above. For example, if a business policy specifies that certain employees should not have access to certain data, an application should not allow those employees to see the data. For instance, it may be desirable for certain employees in an accounting department to have access to salary data while at the same time prohibiting those employees from being able to identify specific persons with specific salaries. Therefore, enforcement of an appropriate business policy may allow an application used by those employees to view anonymized salary data without allowing viewing of specific data for a specific person.

As another example, an interface for a particular business application may have a variety of navigational controls that allow the user to navigate to different interface pages. For users without organizational permission to view certain pages, controls that would typically provide for navigation to those pages may be disabled and/or hidden. For instance, a human resources application may allow full access to employees in the human resources department, but navigation to employee personal information may be blocked for employees of other department. Specific levels of access may be assigned for particular departments, certain classes of employees, and/or other factors. Generally, implementation of policies may involve any type of control over behavior of applications used in a business or organization.

Conventional approaches for modifying application behavior include modifying a core application using configuration or extension application programming interface and using a protocol-specific (such as HTTP-specific) proxy server that modifies the user interface. One problem with application-specific configurations and extensions is that such an approach may be resource-intensive and may require complex integration with a generic policy engine. A problem with a proxy server approach is that, typically, it is specific to HTTP and HTML and not applicable to other protocols, such as SIP and other client types. In addition, conventional proxy server approaches are not well suited for scalability.

BRIEF SUMMARY OF THE INVENTION

Embodiments of the present invention provide techniques for enforcing policies. In one embodiment, a computer-implemented method performed under the control of one or more computer systems configured with executable instructions includes storing policies in a data store and receiving content that is responsive to a request for information from a client. One or more of the policies applicable to the content are identified based at least in part on the content. Executable instructions that are configured to cause the client to process the content according to the identified policies are determined based at least in part on the identified one or more policies. The content is modified to include the executable instructions and the modified content is provided to the client for processing in accordance with the executable instructions.

In an embodiment, the content is a markup document and the executable instructions are a script. The content may include one or more document object model elements and identifying the one or more policies applicable to the content may include determining whether any of the policies apply to the one or more identified document object model elements. Further, identifying the one or more policies applicable to the content may be further based at least in part on an identity of a user of the client. In one embodiment, the executable instructions identify one or more portions of the content to be hidden by the client. The content may also include one or more navigational controls and the executable instructions may be configured to instruct the client to disable at least a subset of the one or more navigational controls.

In another embodiment, a system for providing content is disclosed. The system may include a communication device operable to receive client requests for information and provide responses to the requests, a data store having stored therein a plurality of policies, and a computing device having one or more processors. In an embodiment, the one or more processors are operable to receive content responsive to a request from the client; identify, based at least in part on the content, one or more of the policies applicable to the content; determine, based at least in part on the identified one or more policies, executable instructions that are configured to cause the client to process the content according to the identified one or more policies; modify the content to include the executable instructions; and provide the content for processing by the client. The computing device may be a proxy server that includes the communication device.

In an embodiment, the content includes one or more document object model elements and the computing system is further operable to identify at least one of the one or more document object model elements to which one or more policies apply, and the executable instructions are configured to cause the client to modify the identified at least one document object model element. The computing system may be further operable to determine the executable instructions based at least in part on an identity of a user of the client. In addition, the executable instructions may identify one or more portions of the content to be hidden by the client. The content may also include one or more navigational controls and wherein the executable instructions are configured to instruct the client to disable at least a subset of the one or more navigational controls. The executable instructions may be configured to instruct the client to prevent the client from causing modification of a data store in response to input from a user of the client.

In yet another embodiment, a computer-readable storage medium storing a plurality of computer-executable instructions that cause a computer system to enforce a set of policies is disclosed. The computer-executable instructions may include instructions that cause the computer system to receive content that is responsive to request from a client; to identify, based at least in part on the content and based at least in part on a plurality of policies stored in a data store, one or more of the policies applicable to the content; to determine, based at least in part on the identified one or more policies, one or more scripts that are configured to cause the client to process the content according to the identified one or more policies; to modify the content to include the script; and to provide the content for processing by the client.

In an embodiment, the content is an markup document and the one or more scripts include JavaScript®. The content may include one or more document object model elements and the computer-executable instructions may include instructions that cause the computer system to identify at least one of the one or more document object model elements to which one or more policies apply. The one or more scripts may be configured to cause the client to modify the identified at least one document object model element. The instructions that cause the computer system to determine one or more scripts may include instructions that cause the computer system to determine the one or more scripts based at least in part on an identity of a user of the client. In addition, the one or more scripts identify one or more portions of the content to be hidden by the client. Also, the content may include one or more navigational controls and the one or more scripts may be configured to instruct the client to disable at least a subset of the one or more navigational controls. The one or more scripts may be configured to instruct the client to prevent the client from causing modification of a data store in response to input from a user of the client.

BRIEF DESCRIPTION OF THE DRAWINGS

FIG. 4A shows an illustrative example of an interface page before a policy is implemented for the page;

FIG. 4B shows an illustrative example of the page of 4A, after a policy has been implemented for the page;

DETAILED DESCRIPTION OF THE INVENTION

Figure 1:
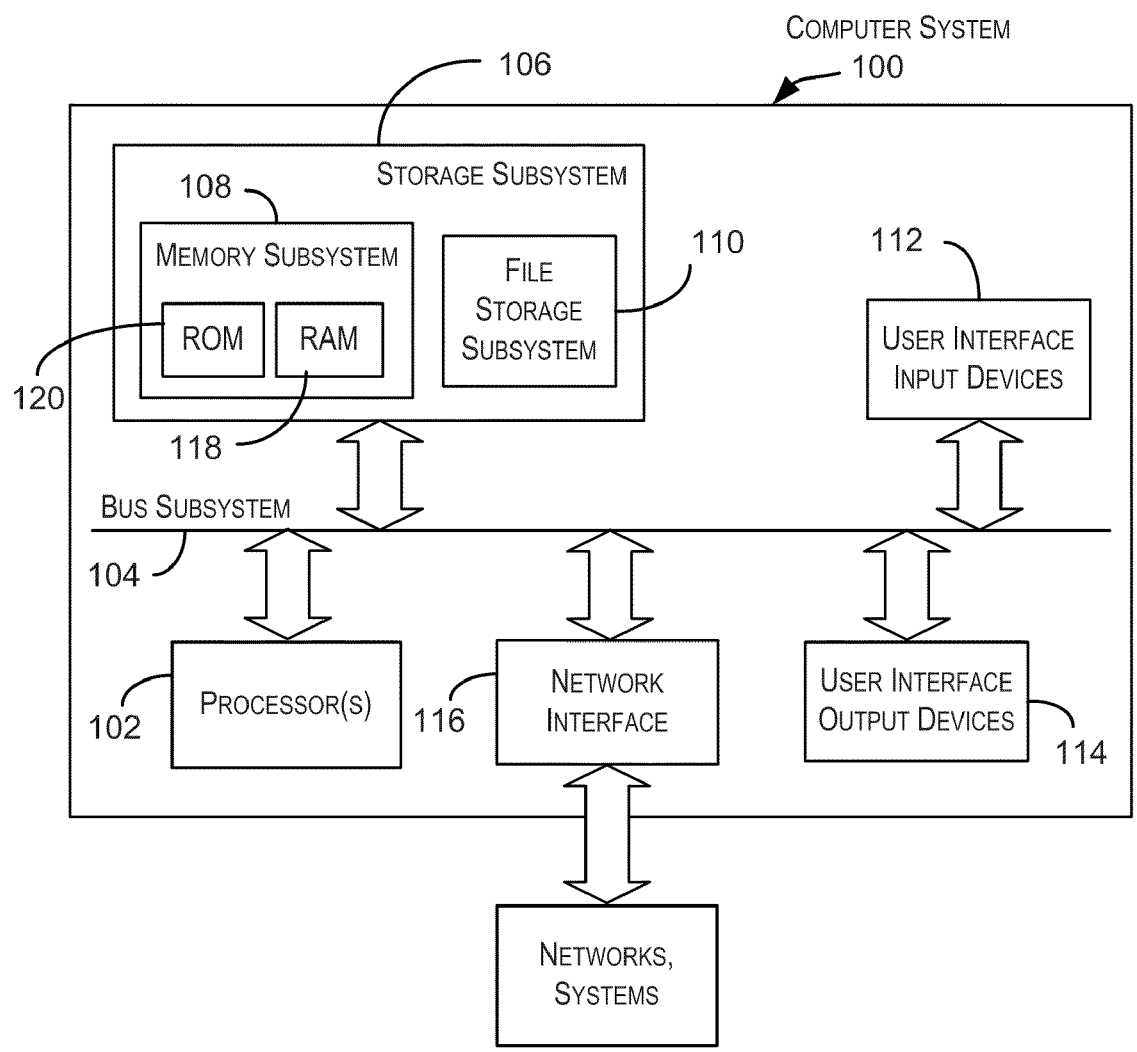
FIG. 1 is a simplified block diagram of a computer system that may be used to practice an embodiment of the present invention.

In the following description, for the purposes of explanation, specific details are set forth in order to provide a thorough understanding of embodiments of the invention. However, it will be apparent that the invention may be practiced without these specific details.

The following description describes an embodiment of the present invention in the business policy domain, and specifically with the operation of applications in accordance with business policies. However, the scope of the present invention is not restricted to business policies, but may be applied to other domains or applications. For example, any domain or application where a set of rules or criteria is used to analyze data may make use of the present invention. Examples of domains in which embodiments of the present invention may be used include segregation of duties, separation of powers, transaction monitoring, and the like.

Embodiments of the present invention provide techniques for implementing policies. As used herein, unless otherwise clear from context, a policy includes a set of one or more conditions. A policy may also include a set of one or more actions to be taken when the set of conditions is met. For example, a policy may be that certain data is only accessible to a certain class of employees, such as employees from a specific department within an organization. In this example, the conditions of the policy are that data be of a specified type and an action of the policy is that access to the data is or should be blocked to all users except those of a predefined class. As another example, a policy may be that only specified people are allowed to direct an application to perform certain functions, such as modifying certain data. In this instance, the conditions are that a user not be part of a specified group and an action may be to disable a control providing for execution of an application function for non-specified users. Embodiments of the present invention may be applied to control of application behavior, as seen from a user perspective, based on one or more conditions.

In an embodiment, a method of enforcing policies is disclosed. The method includes storing policies in a data store, receiving a request from a user for content, and retrieving content applicable to the request. A set of policies applicable to the user is determined for at least a portion of the content applicable to the request and the content, in a manner consistent with the set of policies applicable to the user, and is displayed to the user. Displaying at least a portion of said content may include injecting a script into said content applicable to the request, where the script comprises one or more instructions for modifying said content applicable to the request. In an embodiment, the method may also include generating a script based on the set of policies applicable to the user and injecting said script into a response to said request that includes said content applicable to the request. Several versions of the script, which may be JavaScript®, for execution by different applications, may be generated. Further, displaying at least a portion of said content may include providing a response to said request and modifying and/or blocking at least one document object model element included in said response.

In accordance with another embodiment, a method for enforcing policies is disclosed. The method may comprise storing policies in a data store, receiving a request for content, and generating scripts in accordance with said policies. A response to said request including said content and at least one of said scripts may be prepared. Any of said scripts may be adapted to control display of the content to the user in accordance with one or more of the policies. The method may include identifying a user having submitted said request and determining one or more of said policies applicable to said user. Determining one or more of the applicable policies may include retrieving information applicable to said user from a policy engine. Scripts generated may be retrieved from a cache or dynamically generated based on the request. The method may also include sending the response to a user that has issued the request for content.

In accordance with yet another embodiment, a method for enforcing policies is disclosed. The method comprises selecting an element of a user interface, defining at least one condition for the element, defining at least one action for the element when said at least one condition is satisfied, generating a script comprising one or more instructions for performing said at least one action, and in a request to a user request for content, injecting said script into content sent to said user if said at least one condition is satisfied, said content adapted for display by said user interface. The method may also include using a policy engine to determine whether said at least one condition is satisfied in response to said user request and the policy engine may verify whether the condition is satisfied against a plurality of data stores. The method may also include generating the script in request to the user request where generating the script may include generating a plurality of versions of the script. The action defined in accordance with the disclosed method may include modifying display of said user interface.

In accordance with yet another embodiment, a system that operates in accordance with one or more policies is disclosed. The system comprises a client device adapted to display a user interface to a user, a data store adapted to store one or more policies, and a computing system communicatively coupled to the data store and the client device. In an embodiment, the computing system is adapted to execute an application, generate content based on execution of said application, generate script that modifies the content according to one or more policies stored in the data store, and provide the content and the script to the client device through the user interface. The computing system may be further adapted to inject the script into a document that includes at least a portion of said content and/or to determine a set of policies applicable to the user and/or to generate a plurality of versions of said script, which may be JavaScript®. A script generated may modify and/or remove at least one document object model element used in displaying said content.

In accordance with yet another embodiment, a computer-readable storage medium storing a plurality of computer-executable instructions for enforcing policies, where the plurality of instructions comprising instructions for performing a method of enforcing policies, is disclosed. For example, in an embodiment, the method comprises storing policies in a data store, receiving a request for content, and generating scripts in accordance with said policies, and preparing a response to said request where the response includes the content and at least one of the scripts. A response to said request including said content and at least one of said scripts may be prepared. Any of said scripts may be adapted to control display of the content to the user in accordance with one or more of the policies. The method may include identifying a user having submitted said request and determining one or more of said policies applicable to said user. Determining one or more of the applicable policies may include retrieving information applicable to said user from a policy engine. Scripts generated may be retrieved from a cache or dynamically generated based on the request. The method may also include sending the response to a user that has issued the request for content.

In a specific embodiment, in a client-server architecture, content payload delivered to a client is modified such that the behavior of an application, as exposed through the user interface viewed by a user at the client, is in accordance with one or more policies. In this manner, content and/or features of a user interface may be modified by changing a user's view of a particular application, such as by modifying controls and/or modifying content. For example, a client-executable script, such as Javascript® or another script in another suitable scripting language, may be injected or otherwise inserted into an HTML page sent to the client from the server in order to remove, add, or modify content and/or other features delivered to the user, such as by removing, adding, or modifying Document Object Model (DOM) elements. Other examples of content modification in accordance with an embodiment can be found in Appendix I of U.S. Provisional Application No. 61/164,363. As used herein, script is code or instructions that can be executed by the client.

For example, in an embodiment, a user uses a web browser in order to access a business application. Accessing the application may involve directing the browser to an address for the application and identifying himself or herself by inputting login information. Use of the application by the user may involve the browser sending requests to a server and receiving responses to the requests. In an embodiment, in response to a user's action (such as selection of a navigational control), a browser may make a request to an enterprise resource planning (ERP) system, such as a request for data matching user-specified criteria, by sending a URL pattern. The request may first arrive at a proxy server which will interact with a central policy engine to determine what, if any, policies apply to the user. An example of a suitable policy engine can be found in Appendix II of U.S. Provisional Application No. 61/164,363.

The proxy server may also interact with a business application in order to retrieve the content requested by the user or retrieve the content from a cache. If any policies apply to the user, the proxy server may inject appropriate script into the content returned to the user. For example, scripts may be stored in a cache for retrieval by the proxy server. Also, scripts may be generated dynamically. For example, the JavaScript® code may be generated directly or Java code that modifies the user interface according to applicable policies may be created and then converted to appropriate JavaScript®. For instance, a Google Web Tools (GWT) Java-to-JavaScript® compiler may be used in order to provide a script that is compatible with commonly-used browsers. Once generated, the proxy server may inject script into the HTML or other content returned to the user. In an embodiment, an Apache Proxy Plugin is used to inject script. Further details are located in Appendix I of U.S. Provisional Application No. 61/164,363.

In addition to the above, techniques are provided for authoring policies, in accordance with an embodiment. In particular, in an embodiment, content from various business applications can be viewed through either a user module or a developer module. Content presented through the developer module may be similar to content viewed through the user module, although, in an embodiment, the developer module includes more functionality than that which is provided with a user module. In particular, in an embodiment, a user of the developer module may select one or more elements of the interface (such as by right-clicking with a mouse or otherwise selecting) and define specific policies with respect to those elements.

For example, selecting an element of the user interface through the developer module may provide the element's location in the DOM, the data type of the element, and/or other information. In addition, one or more criteria may be able to be selected for the element and one or more actions may be specified to be performed if the conditions are met. Thus, a developer may specify that a value in an element is hidden except for certain classes of employees. As another example, navigation controls to various portions of an application may be disabled for certain employees or, similarly, navigation controls may only be enabled for certain employees. Conditions and actions may be set using common user interface controls, such as radio buttons, drop-down boxes, and other controls. In an embodiment, a free form text field is included for a condition or a control so that a developer may, using an appropriate language, such as JavaScript®, create his or her own conditions and/or actions.

It should be understood that the present disclosure provides a specific example where a proxy server interacts with one or more business applications and injects appropriate script into content payload to be delivered to a user's browser in order to control the content displayed to the user, but that other configurations are possible in accordance with the present invention. For example, other computing devices other than those disclosed, which may be in configurations different than those disclosed herein, may be used to execute the various functions disclosed herein. In addition, while examples of specific languages used to implement the various functions are given, other appropriate languages may be used depending on specific contexts.

FIG. 1 is a simplified block diagram of a computer system 100 that may be used to practice an embodiment of the present invention. Computer system 100 may serve as a processing system 102 or a client system 120 depicted in FIG. 1. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to provide a graphical representation of a policy.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. The process of manipulating the graphical objects as well as results of implementing policies may be output to the user via an output device.

Storage subsystem 106 provides a computer-readable medium for storing the basic programming and data constructs that provide the functionality of the present invention. Software (programs, code modules, instructions) that, when executed by a processor, provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 406 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read-only memory (ROM) 120 in which fixed instructions are stored. File storage subsystem 110 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
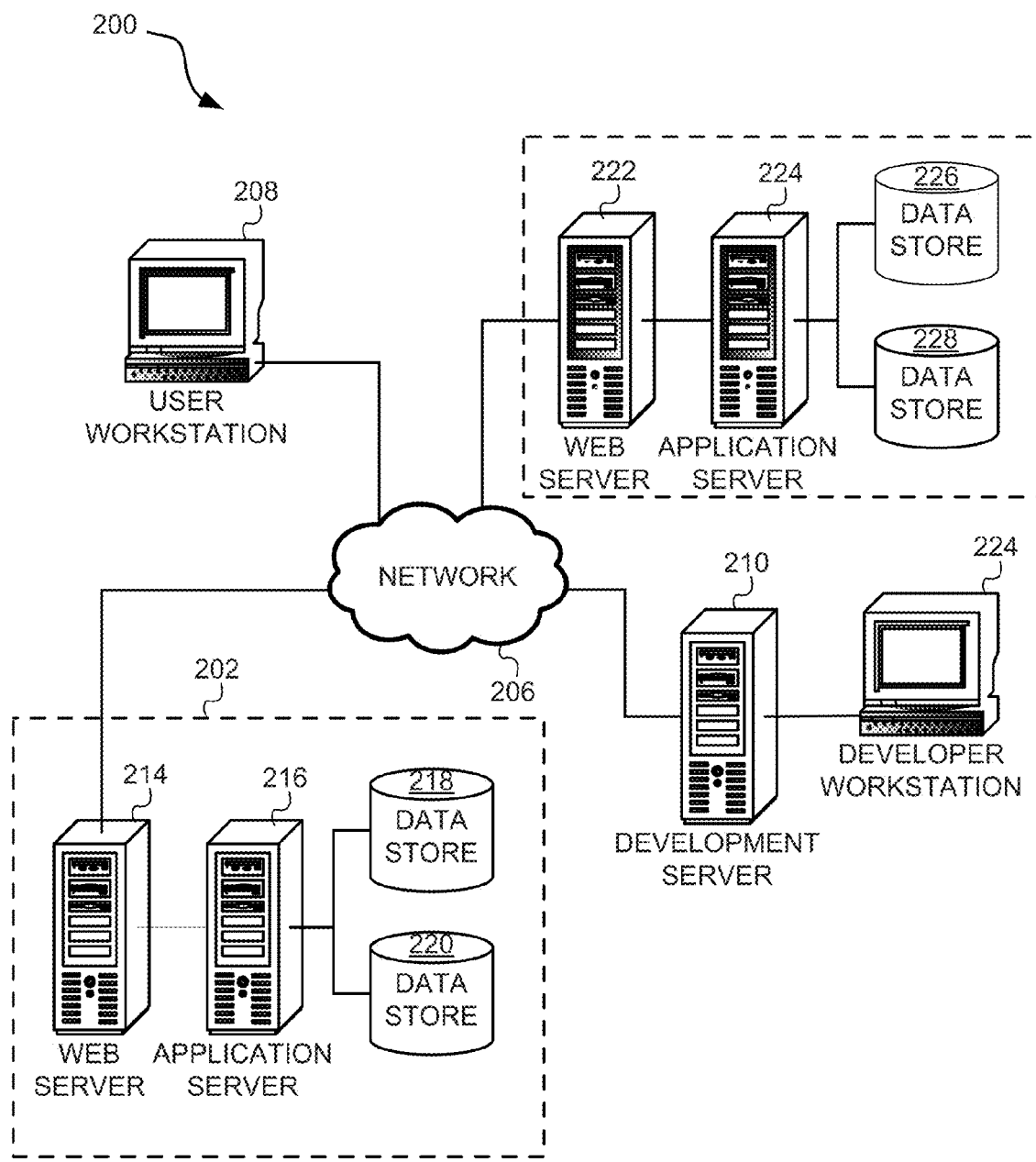
FIG. 2 is an example of an environment in which embodiments of the invention may be practiced.

FIG. 2 shows a simplified block diagram of an enterprise computer system 200 that may be used to practice an embodiment of the present invention. It should be understood that, generally, enterprise computer systems vary greatly and, as a result, specific embodiments may include more or fewer components than shown in the figure and that the specific components shown in FIG. 2 are only intended to provide an example for the purposes of illustration.

In accordance with an embodiment, the enterprise computer system 200 includes a first location 202 and a second location 204 communicatively connected by a network 206, such as the Internet or any suitable communications network or combination of networks. In an embodiment, the first location 202 and second location 204 correspond to separate physical locations of a business, such as offices in two separate cities, states, or countries. While FIG. 2 shows two locations, it should be understood that a business may have only a single location and may include more than two locations. As shown in the drawing, the enterprise computer system 200 may include one or more user workstations 208, a development server 210, and a developer workstation 212. The user workstation 208, development server 210, and/or development workstation 212 may be physically present at any of the locations, or at separate locations. In an embodiment, the user workstation 208 and development server 210 are communicatively connected to the network 206 so as to access various components of the enterprise computer system. For example, the user workstation 208 may include a browser used for viewing content provided from the Internet and/or from other systems within the business. Further, the developer workstation 212 may be connected to the network 206 through the development server 210 and may be adapted to provide certain employees within the organization the ability to configure, install, modify, and perform other actions in connection with the business' computing systems. As an example, a developer within the organization may utilize the developer workstation in order to create the policies that are used to define scripts injected into payload content, as described above, and send the policies over the network 206 to an appropriate data store.

As noted above, the first location 202 may include various computer systems used in operating the business. For example, in the example shown, the first location 202 includes a web server 214 configured to receive requests from various users, such as from a user of the user workstation 208, and to provide requests over the network 206. While FIG. 2 shows the web server as a hardware component, as with any of the servers described herein, the web server may also be a software module operating on a computer system. Responses from the web server 214 can be provided from a variety of sources, such as from components of an internal computer system of the first location 202 or from other web servers located at other, possibly third-party, locations. The web server 214 may also include a proxy server that injects script into content payload delivered to the user workstation 208, in accordance with embodiments of the invention described herein.

In an embodiment, the web server 214 is communicably coupled to an application server 216, which is a hardware component or software module configured to run one or more applications, such as one or more policy engines and other applications for managing organizational data. As is known, a user of the user workstation 208 may send a request to the web server 214 that specifies a specific action to be taken in connection with an internal business application implemented on the application server 216. The web server 214 then relays the request to the application server 216 which takes the specified action and returns the result of that action to the web server 214, which in turn relays the result to the user workstation 208. In accordance with an embodiment, the web server 214, or other component, may modify the content returned to the user workstation 208 in accordance with one or more policies applicable to a user of the user workstation 208.

As shown in the example of FIG. 2, the application server 216 interacts with data stored in a first data store 218 and a second data store 220, each of which stores data relevant to the business' operation, such as in one or more relational or other databases. While the disclosed example shows the first location 202 having two data stores, it should be understood that the first location 202 may have less than two data stores or more than two data stores. Information in the data stores can include a wide variety of data, such as data relating to business transactions, invoices, human resources data, user account data, receipts, bank account data, accounting data, payroll data, and generally, any data relevant to the operation of a particular business.

In an embodiment, the second location includes its own web server 222, application server 224, first data store 226, and second data store 224 which may be configured to function similarly to the identically named components above.

Figure 3:
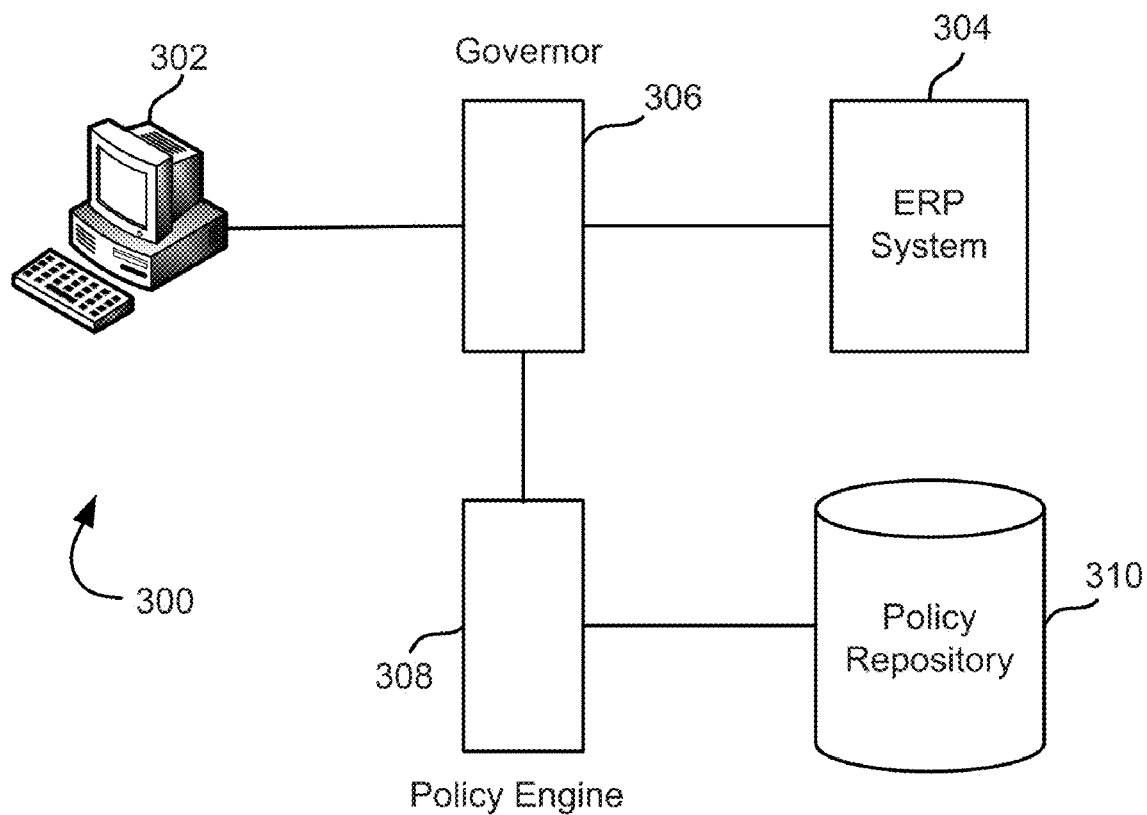
FIG. 3 is an example of an environment for implementing policies, which may be part of the environment of FIG. 2, in accordance with an embodiment.

FIG. 3 shows an illustrative environment 300 for enforcing policies, which may be implemented as part of the environment 200 described above. In an embodiment, the environment 300 includes a browser 302 communicatively connected with an ERP system 304. While the figure shows the browser 302 implemented on a personal computer, any suitable computing device operable to display or otherwise process content may be substituted. Example computing devices include desktop computers, notebook computers, mobile phones, personal digital assistants, electronic notepads, servers, and the like. Further, while the figure shows a single browser 302 for the purpose of illustration, actual environments may include multiple browsers being used by multiple users. Also, while the present disclosure describes the invention in terms of a browser, it should be understood that any application that processes content may be used.

In an embodiment, communications between the browser 302 and the ERP system 304 is transmitted through a governor 306. In an embodiment, the governor 306 is a computing device operable to receive requests from the browser 302, forward those requests to an appropriate server of the ERP system 304, receive responses to the requests from the appropriate server of the ERP system, and forward those responses to the browser 302.

In an embodiment, the governor 306 applies one or more policies to the communications occurring between the ERP system. Examples include preventing or restricting access to certain data in the ERP system, preventing certain navigational sequences by the browser, modifying display content to be hidden or read-only, pre-populating fields with calculated values, validating data entries, validating transactions, displaying messages to the user, displaying required approval requests, updating approval status, and the like. The policies implemented by the governor may be based on a variety of conditions, such as conditions related to data in the communications, characteristics of the browser's requests, a user identity, and the like. For example, the governor 306 may include a Single Sign On (SSO) adaptor that allows a user of the browser 302 to provide login credentials a single time in order to authenticate with a plurality of the subsystems of the ERP system 304 and remain authenticated with the subsystems for a complete session. Content provided from the subsystems of the ERP system may be modified based on a classification of the user which may be ascertained by the user's login credentials. As a concrete example, the governor 306 may use the user's identity to determine that the user is an employee of the accounting department and, therefore, the governor may anonymize any salary data sent from a human resources system of the ERP system 304. Using this same example, the governor 306 may prevent the user from modifying salary data sent from the human resources system, and/or from navigating to one or more content pages of the human resources system.

In an embodiment, the governor 306 communicates with a policy engine 308 which receives data from the various data stores of the ERP system 304 and analyzes the data to determine whether one or more policies stored in a policy repository 310 are implemented. An example of a policy engine appears in U.S. patent application Ser. No. 12/714,206, filed Feb. 26, 2010, which is incorporated herein by reference for all purposes. However, other policy engines may be used. A suitable policy engine is available in Oracle® Application Access Controls Governor 8.0 available from Oracle Corporation.

As noted, in an embodiment, when content is directed from the ERP system toward the browser 302, the governor 306 receives the content, and generates a message that is sent to the policy engine 308. The message may identify information about the content from which the policy engine 308 may determine whether any policies in the policy repository are invoked. Information about the content in the message may indicate which semantic objects are included in the content (employees, employee classes, invoices, line items, and the like), identify the user of the browser and/or a classification the user is in, and the like. The message may also include the data included in the content, such as numerical values, employee names, identification numbers, and the like. In an embodiment, the governor 306 identifies document object model (DOM) elements in the content and converts the DOM elements into data usable by the policy engine 308 according to a mapping that associates DOM elements with corresponding semantic objects. For example, the governor 306 may convert information from the content into a file containing information organized according to the Ontology Web Language (OWL) according to a mapping that associates DOM elements with OWL elements of an OWL-based schema.

Upon receipt of the message, the policy engine 308 inspects the message and determines whether conditions of any of the policies in the policy repository 310 are met. If the conditions of any of the policies are met, then the policy engine 308 sends a message to the governor 306 that indicates to the governor how the content should be modified before it is sent to the browser 302. In an embodiment, the governor 306 caches a plurality of JavaScript® files that may be applicable and, based on the message, the governor 306 selects appropriate JavaScript® files from the cache and injects the script of the files appropriately. In an embodiment, the injected JavaScript® modifies the content such that the user's experience with the content is different from the experience provided to the user had the JavaScript® not been injected. For example, as noted, the injected JavaScript® may change the information that is displayed to the user, disable one or more navigational controls, add one or more navigational controls, prevent access and/or modification to data, and/or cause other changes to the user's experience with the content.

Once the content is modified by the governor 306, the modified content, in an embodiment, is sent to the browser 302 for display. The browser 302 receives the modified content and renders and displays the modified content in accordance with the injected JavaScript®. Thus, in an embodiment, the browser displays the modified content according to instructions of the injected JavaScript®.

FIGS. 4A-4B provide an illustrative example of content before injection of JavaScript® and content after injection of JavaScript®, respectively. Beginning with FIG. 4A, the drawing shows a fictional illustrative interface page 400 of a human resources subsystem of an ERP system. The page 400 may have been sent from the human resources subsystem to a requestor of the page, such as an employee having navigated through an interface of the human resources subsystem to the page 400 in order to view employee salary data. Thus, the example page 400 shows how a browser of the user may render the page 400, as the page 400 was sent from the human resources subsystem. In the example shown, the page 400 shows a table 402 associating employee names with salaries. The example page 400 also shows, for each employee in the table 402, a change button 404. Upon selecting a change button 404, in this example, the user would navigate to a portion of the interface that would provide for changing a corresponding value in the table 402. If unauthorized, changing of an employee could have undesirable consequences, including overpayment or underpayment to the employee whose salary was changed.

Accordingly, FIG. 4B shows an example page 406 which corresponds to the page 400 of FIG. 4A. In this illustrative embodiment, the page 406 has been modified in accordance with one or more policies that require salary data to be anonymized and changes to the salary data prevented. For instance, the user who navigated to the page 406 may be an employee who is at most allowed to view anonymized salary data and who is not authorized to change the salary data. In an embodiment, the content of the page 406 includes a script which instructs a browser to replace employee names in the first column of the table 402 with a series of the letter x and which removes the column of the table 402 that includes the change buttons. Additionally, the script causes the rows of the table 402 to be in a different order than they appear in the page 400 of FIG. 4A. Thus, the script of the page 406 prevents a user whose browser renders the page 406 from identifying which employees are associated with which salaries, and from changing any of the values. Also, the content of the page 406 may include all of the information of the content of the page 400 of FIG. 4A, with the script modifying the user's experience such that all of the information of the page 400 is not displayed on the page 406.

Figure 5:
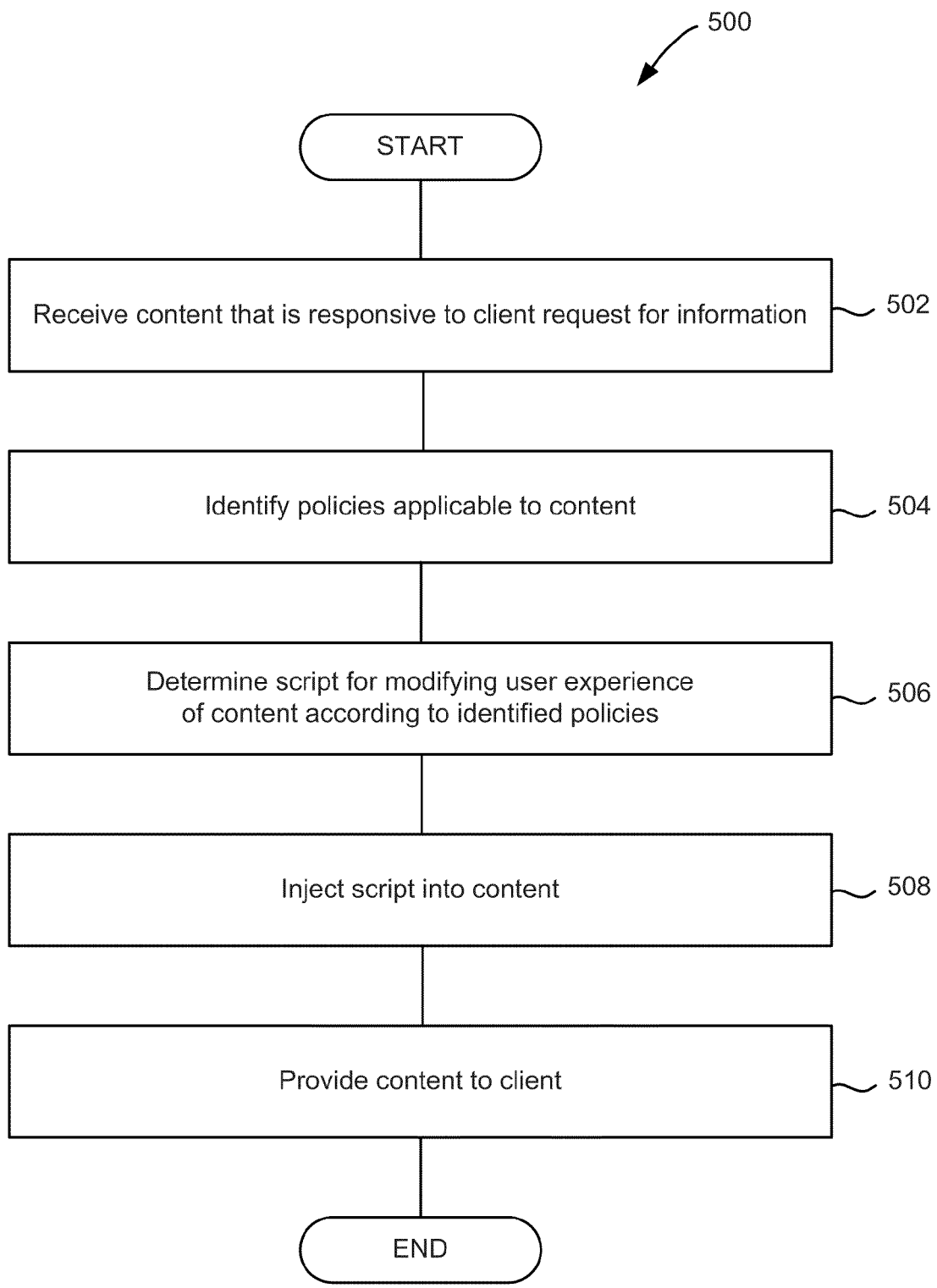
FIG. 5 shows a process for implementing policies, in accordance with an embodiment.

FIG. 5 shows a process 500 for implementing policies, in accordance with an embodiment. The process 500, as may any process or variation of any process described herein, may be implemented by one or more computer systems configured with executable instructions for performing the process 500. The executable instructions may be embodied on one or more computer-readable storage media that collectively store the executable instructions. The process may be performed, for instance, by the governor described above in connection with FIG. 3.

In an embodiment, content that is responsive to a client request for information is received 502. The content may be received in transit from a content source to a receiver. For example, the content may be received by a proxy server through which communications between a browser on a client computer and a web server of an ERP system pass, although the content may be received in other ways. Generally, the content may be received in any manner.

Figure 6:
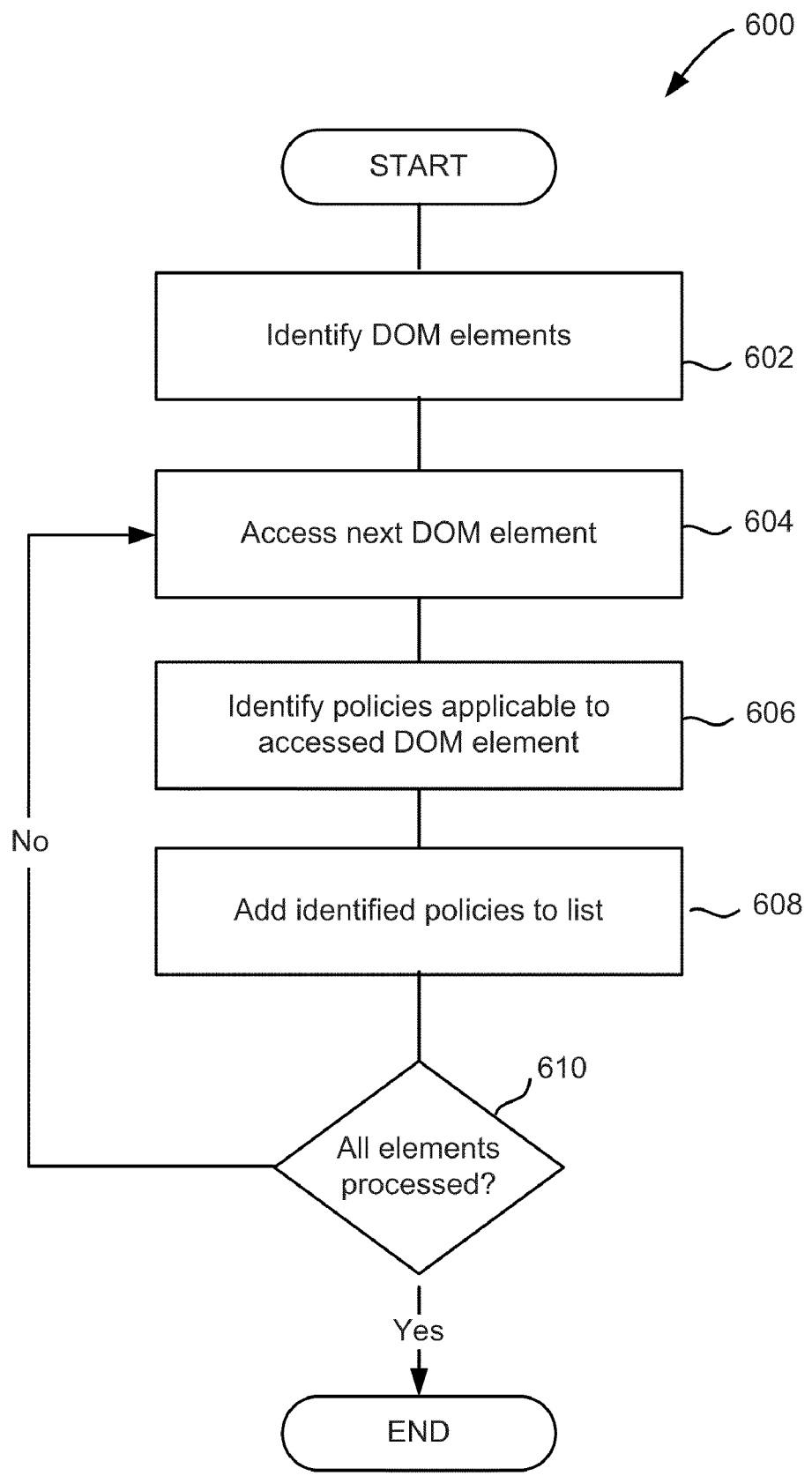
FIG. 6 shows a process for identifying policies applicable to content that may be used in connection with the process of FIG. 5, in accordance with an embodiment.

Once the content is received, in an embodiment, one or more policies applicable to the content is identified 504. In an embodiment, a policy is applicable to the content if the conditions of the policy are met. The conditions of the policy may be based on some or all of the content itself, a user identity, or other information. An illustrative example of identifying policies applicable to the content, in accordance with an embodiment, is described below in connection with FIG. 6. Returning to FIG. 5, in an embodiment, a script for modifying a user's experience with the content is determined 506. Determining the script may be performed in any suitable way. In an embodiment, scripts are cached in a data store in a manner allowing for selection of an appropriate script. For example, the scripts in the data store may be indexed according to one or more indexes that allow identification of an appropriate script by the user of one or more indices. For example, if a particular policy is identified, the policy may be associated with a unique identifier that may be used to select one or more scripts associated with the policy. Turning to the example of FIGS. 4A and 4B, the policy that employees of a particular class may only view anonymized salary data and may not change salary data may be associated by an index with a script which replaces employee names with a series of the letter X (or which otherwise anonymizes names). The policy may be also be associated by the index with a script that randomizes the rows of the table, or that orders the rows by the salary value, or otherwise changes the order to the tables. The policy may yet still be associated by the index with a script that disables, removes, or otherwise modifies change buttons in order to prevent changing of data. As noted, scripts associated with a policy may perform other actions, such as preventing information (such as images or other content) from being retrieved from a server, removing hyperlinks or other navigational content, and otherwise.

Scripts may also be determined in other ways. For example, scripts may be dynamically generated. Java code, for instance, may be generated based on one or more factors, such as the content and the identity of the user when the content is received. The Java code may be converted to a script for injection into the content. The Google Web Toolkit (GWT) available from Google, Inc. or other suitable tool may be used to generate JavaScript® dynamically and/or statically. Generally, any way of determining one or more scripts may be used. As another example, templates of Java code may be marshaled depending on factors, such as the content, user identity, and other factors. As above, the Java code may be converted to JavaScript®.

In an embodiment, the determined scripts are injected 508 into the content. For example, if the content is associated with an HTML document, the script may be inserted into the HTML document in an appropriate location, such as immediately before a <body> tag such that the script is executed first by a browser that receives the content. The script may be located in other locations in the content, as appropriate. For example, various scripts may be injected into various locations of the content, as appropriate for implementation of a policy.

The following is an illustrative example of hypertext markup language (HTML) code prior to injection of a script in accordance with one or more policies.

```
<html>
  <head>
    <title>Test Page</title>
    <meta http-equiv="Content-Type" content="text/html; charset=utf-8">
      <link rel="stylesheet" type="text/css" href="css/Context.css">
      <link rel="stylesheet" type="text/css" href="css/ext-all.css">
      <link rel="stylesheet" type="text/css" href="css/Select.css">
  </head>
  <body style='background-color: #EEEEEE'>
    <div id="grcc-loading-splash" style="background-color:white;position:absolute;left:45%;top:40%;z-index:3201;border: 1px solid black;padding:10px;">
      <div style="display:table-cell;text-align:center;vertical-align:middle;">
        <span style="white-space: nowrap;">
          <img height="48" width="43" border="0" alt="" style="vertical-align: middle;" src="images/ss.gif"/>
          <span id="grcc-splash-message" style="color:#779EC7;font-family:Tahoma,Verdana,Helvetica,sans-serif;font-size:14px;font-weight:bold;padding-left:15px;">Loading...</span>
        </span>
      </div>
    </div>
    Hello World: <input name="hello" />
  </body>
</html>
```

The following is an example of the same HTML code with a script injected into a <head> element:

```
<html>
  <head>
    <title>Test Page</title>
    <meta http-equiv="Content-Type" content="text/html; charset=utf-8">
      <link rel="stylesheet" type="text/css" href="css/Context.css">
      <link rel="stylesheet" type="text/css" href="css/ext-all.css">
      <link rel="stylesheet" type="text/css" href="css/Select.css">
      <script src="http://localhost:8080/prevent_script.js"></script>
      <script src="js/prevent_script.js"></script>
  </head>
  <body style='background-color: #EEEEEE'>
    <div id="grcc-loading-splash" style="background-color:white;position:absolute;left:45%;top:40%;z-index:3201;border: 1px solid black;padding:10px;">
      <div style="display:table-cell;text-align:center;vertical-align:middle;">
        <span style="white-space: nowrap;">
          <img height="48" width="43" border="0" alt="" style="vertical-align: middle;" src="images/ss.gif"/>
```

-continued

```
    <span id="grcc-splash-message" style="color:#779EC7;font-
family:Tahoma,Verdana,Helvetica,sans-serif;font-size:14px;font-weight:bold;padding-
left:15px;">Loading...</span>
        </span>
      </div>
    </div>
    Hello World: <input name="hello" />
  </body>
</html>
```

As can be seen in this example, JavaScript® code is injected into the HTML code in a <head> element by providing a link to JavaScript® code externally stored. Specifically, the code is includes a link to JavaScript® inside of <script> tags. Thus, when a browser receives the modified HTML code, the browser will request the JavaScript® from a location specified in the <script> tags and execute the script. As noted above, the executed script may cause the browser to display content associated with the HTML document in a manner different than had the JavaScript® not been injected. The effect of the JavaScript®, in an embodiment, is in accordance with one or more policies related to the content.

It should be noted that, while the illustrative example of the preceding paragraph shows JavaScript® being injected by a link to externally stored JavaScript®, other scripts may be used and other methods of injecting the script may be practiced. For instance, the code of a script may be placed directly into the HTML or other code for the document instead or in addition to a link that specifies a location of externally-stored script. Generally, any method of injecting script into content provided to a requestor of the content may be used.

In an embodiment, the content with the injected script or scripts is provided 510 to the client. For example, the content with script(s) may be directed toward an Internet Protocol (IP) address of the client. In this manner, the client will receive the content, execute the script, and the user's experience with the content will be in accordance with the identified policies.

As discussed above, FIG. 6 shows a process 600 of identifying policies applicable to content, in accordance with an embodiment. In an embodiment, the content is embodied in a document (or several documents) that are organized according to a DOM. For example, the content may be encoded as a hypertext markup language (HTML) document. Accordingly, once the content is received, DOM elements are identified 602, in accordance with an embodiment. Identifying the DOM elements may include identifying the DOM of the document. With the DOM elements identified, the DOM elements are accessed sequentially in an embodiment, although the DOM elements may be otherwise accessed. When each next DOM element is accessed 604, policies applicable to the accessed DOM are identified 606. For instance, in an embodiment, DOM elements may be associated by a mapping with semantic objects, such as employees, employee classes, invoices, payments, line items, credit card charges, and the like. A policy engine, such as the policy engine described above, determines whether the conditions of any policies are met for the accessed DOM element. If the DOM element is a table having employee salaries, for instance, a determination may be made whether any policies are applicable to employee salaries. As discussed, determining whether any policies are applicable to the employee salaries may be based on other factors, such as the identity of the user who has requested the content, or other factors.

Once the one or more policies applicable to the accessed DOM are identified, the identified one or more policies may be added 608 to a list. For example, unique identifiers of policies may be added to a list or other object. Once policies applicable to the accessed DOM element are identified, a determination is made 610 whether all of the elements have been processed. If not, the next DOM element is accessed 604, and the process continues as above. It should be noted that not all DOM elements need be accessed. For example, continuing with the table example, once policies applicable to the table are identified, the table entry DOM elements (sub-elements of the table DOM element) may not be accessed. However, all DOM elements may be accessed, in an embodiment. If all elements have been accessed, the process ends, in an embodiment.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method of enforcing policies, comprising:
   storing policies in a data store;
   receiving content that is responsive to a request for information from a client;
   identifying, based at least in part on the content, one or more of the policies applicable to the content;
   determining, based at least in part on the identified one or more policies, executable instructions that are configured to cause the client to process the content according to the identified one or more policies;
   modifying the content to include the executable instructions; and
   providing the modified content for processing by the client.

2. The computer-implemented method of claim 1, wherein the content is a markup document and wherein the executable instructions are a script.

3. The computer-implemented method of claim 1, wherein the content includes one or more document object model elements and wherein identifying the one or more policies applicable to the content includes determining whether any of the policies apply to the one or more identified document object model elements.

4. The computer-implemented method of claim 1, wherein identifying the one or more policies applicable to the content is further based at least in part on an identity of a user of the client.

5. The computer-implemented method of claim 1, wherein the executable instructions identify one or more portions of the content to be hidden by the client.

6. The computer-implemented method of claim 1, wherein the content includes one or more navigational controls and wherein the executable instructions are configured to instruct the client to disable at least a subset of the one or more navigational controls.

7. A system for providing content, comprising:
a communication device operable to receive client requests for information and provide responses to the requests;
a data store having stored therein a plurality of policies;
a computing device having one or more processors and being operable to:
receive content responsive to a request from the client;
identify, based at least in part on the content, one or more of the policies applicable to the content;
determine, based at least in part on the identified one or more policies, executable instructions that are configured to cause the client to process the content according to the identified one or more policies;
modify the content to include the executable instructions; and
provide the modified content for processing by the client.

8. The system of claim 7, wherein the computing device is a proxy server that includes the communication device.

9. The system of claim 7, wherein the content includes one or more document object model elements, wherein the computing system is further operable to identify at least one of the one or more document object model elements to which one or more policies apply, and wherein the executable instructions are configured to cause the client to modify the identified at least one document object model element.

10. The system of claim 7, wherein the computing system is further operable to determine the executable instructions based at least in part on an identity of a user of the client.

11. The system of claim 7, wherein the executable instructions identify one or more portions of the content to be hidden by the client.

12. The system of claim 7, wherein the content includes one or more navigational controls and wherein the executable instructions are configured to instruct the client to disable at least a subset of the one or more navigational controls.

13. The system of claim 7, wherein the executable instructions are configured to instruct the client to prevent the client from causing modification of a data store in response to input from a user of the client.

14. A non-transitory computer-readable storage medium storing a plurality of computer-executable instructions that cause a computer system to enforce a set of policies, the computer-executable instructions comprising:
instructions that cause the computer system to receive content that is responsive to request from a client;
instructions that cause the computer system to identify, based at least in part on the content and based at least in part on a plurality of policies stored in a data store, one or more of the policies applicable to the content;
instructions that cause the computer system to determine, based at least in part on the identified one or more policies, one or more scripts that are configured to cause the client to process the content according to the identified one or more policies;
instructions that cause the computer system to modify the content to include the script; and
instructions that cause the computer system to provide the modified content for processing by the client.

15. The non-transitory computer-readable storage medium of claim 14, wherein the content is an markup document and wherein the one or more scripts include JavaScript.

16. The non-transitory computer-readable storage medium of claim 14, wherein the content includes one or more document object model elements, wherein the computer-executable instructions include instructions that cause the computer system to identify at least one of the one or more document object model elements to which one or more policies apply, and wherein the one or more scripts are configured to cause the client to modify the identified at least one document object model element.

17. The non-transitory computer-readable storage medium of claim 14, wherein the instructions that cause the computer system to determine one or more scripts include instructions that cause the computer system to determine the one or more scripts based at least in part on an identity of a user of the client.

18. The non-transitory computer-readable storage medium of claim 14, wherein the one or more scripts identify one or more portions of the content to be hidden by the client.

19. The non-transitory computer-readable storage medium of claim 14, wherein the content includes one or more navigational controls and wherein the one or more scripts are configured to instruct the client to disable at least a subset of the one or more navigational controls.

20. The non-transitory computer-readable storage medium of claim 14, wherein the one or more scripts are configured to instruct the client to prevent the client from causing modification of a data store in response to input from a user of the client.

* * * * *

UNITED STATES PATENT AND TRADEMARK OFFICE
CERTIFICATE OF CORRECTION

| | | |
|---|---|---|
| PATENT NO. | : 8,312,171 B2 | Page 1 of 1 |
| APPLICATION NO. | : 12/749224 | |
| DATED | : November 13, 2012 | |
| INVENTOR(S) | : B'Far et al. | |

It is certified that error appears in the above-identified patent and that said Letters Patent is hereby corrected as shown below:

On page 2, in column 1, under "Other Publications", line 13, delete "Sematic" and insert -- Semantic --, therefor.

Signed and Sealed this
Fifth Day of February, 2013

Teresa Stanek Rea
*Acting Director of the United States Patent and Trademark Office*